(12) United States Patent
Kanehara et al.

(10) Patent No.: US 9,739,374 B2
(45) Date of Patent: Aug. 22, 2017

(54) HYDRAULIC PRESSURE SUPPLY APPARATUS FOR AUTOMATIC TRANSMISSION

(71) Applicant: HONDA MOTOR CO., LTD., Tokyo (JP)

(72) Inventors: Shigeru Kanehara, Wako (JP); Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 14/765,858

(22) PCT Filed: Jan. 28, 2014

(86) PCT No.: PCT/JP2014/051749
§ 371 (c)(1),
(2) Date: Aug. 5, 2015

(87) PCT Pub. No.: WO2014/123027
PCT Pub. Date: Aug. 14, 2014

(65) Prior Publication Data
US 2015/0369363 A1 Dec. 24, 2015

(30) Foreign Application Priority Data

Feb. 6, 2013 (JP) .................................. 2013-021293

(51) Int. Cl.
*F16H 59/00* (2006.01)
*F16H 61/00* (2006.01)
(Continued)

(52) U.S. Cl.
CPC ... *F16H 61/66272* (2013.01); *F16H 57/0446* (2013.01); *F16H 57/0456* (2013.01);
(Continued)

(58) Field of Classification Search
CPC ......... F16H 61/66272; F16H 61/66259; F16H 61/12; Y10T 477/6242; Y10T 477/624
(Continued)

(56) References Cited

U.S. PATENT DOCUMENTS 4,644,827 A * 2/1987 Takano ................. B60W 30/18
474/18
4,995,283 A * 2/1991 Sawasaki ............. B60W 30/18
477/41

(Continued)

FOREIGN PATENT DOCUMENTS

JP     2-275168 A     11/1990
JP     2003-27912 A   1/2003

(Continued)

OTHER PUBLICATIONS

International Search Report dated Apr. 22, 2014, issued in counterpart International Application No. PCT/JP2014/051749 (2 pages).

*Primary Examiner* — Henry Liu
(74) *Attorney, Agent, or Firm* — Westerman, Hattori, Daniels & Adrian, LLP

(57) ABSTRACT

A hydraulic pressure supply apparatus for automatic transmission having a first and a second regulator valves 50, 52 that are installed in a first and a second oil passages 46, 48 that connect a hydraulic pump 44 for pumping and discharging hydraulic oil from a reservoir 42 and a plurality of hydraulic actuators and depressurize the hydraulic oil discharged from the pump to pressure required by the hydraulic actuators, a third and a fourth oil passages 56, 58 that convey discharged hydraulic oil to lubrication system 54 and an ejector 60 having a nozzle 60a connected to one of the third and fourth oil passages and an intake 60b connected to the reservoir 42 such that hydraulic oil merged at a diffuser 60c is conveyed to the lubrication system 54 through a fifth oil passage 62, hydraulic energy generated by the hydraulic (Continued)

pump can be effectively utilized in an automatic transmission having the hydraulic actuators and lubrication system.

6 Claims, 5 Drawing Sheets

(51) Int. Cl.
    *F16H 63/00*     (2006.01)
    *F16H 57/04*     (2010.01)
    *F16H 61/662*     (2006.01)
    *F16H 61/664*     (2006.01)

(52) U.S. Cl.
    CPC ..... *F16H 57/0489* (2013.01); *F16H 61/0021* (2013.01); *F16H 61/0025* (2013.01); *F16H 61/6649* (2013.01); *F16H 2061/0037* (2013.01); *F16H 2061/0046* (2013.01)

(58) Field of Classification Search
    USPC ........................................................ 474/28, 91
    See application file for complete search history.

(56) References Cited

U.S. PATENT DOCUMENTS

| | | | | |
|---|---|---|---|---|
| 5,263,387 A * | 11/1993 | Reniers | ............... | F16H 61/12 474/18 |
| 5,769,182 A * | 6/1998 | Parenteau | ............... | F16N 7/40 184/104.1 |
| 6,306,061 B1 * | 10/2001 | Inamura | ............... | F16H 61/14 477/45 |
| 6,315,693 B1 * | 11/2001 | Tayama | ............... | B60W 10/107 474/18 |
| 6,454,675 B2 * | 9/2002 | Asayama | ............... | B60W 10/06 474/28 |
| 6,783,479 B2 * | 8/2004 | Agner | ............... | F16H 61/12 477/156 |
| 7,713,165 B2 * | 5/2010 | Kim | ............... | F16H 61/66259 477/115 |
| 7,946,389 B2 * | 5/2011 | Kakinami | ............... | F16H 57/04 123/196 R |
| 8,126,621 B2 * | 2/2012 | Ishii | ............... | E02F 9/2235 474/18 |
| 8,572,956 B2 * | 11/2013 | Miyabe | ............... | F16H 61/0031 60/358 |
| 8,651,240 B1 * | 2/2014 | Motto | ............... | F01D 25/18 184/7.4 |
| 8,672,093 B2 * | 3/2014 | Okano | ............... | F03D 80/70 184/4 |
| 8,833,335 B2 * | 9/2014 | Karasawa | ............... | F01M 1/02 123/196 R |
| 8,857,382 B2 * | 10/2014 | Yagasaki | ............... | F16H 61/0025 123/2 |
| 2001/0024988 A1 * | 9/2001 | Kashiwase | ............... | F16H 57/0434 475/210 |
| 2006/0065217 A1 * | 3/2006 | Ikegawa | ............... | F01M 1/02 123/41.42 |
| 2006/0070600 A1 * | 4/2006 | Hara | ............... | F01L 1/46 123/196 R |
| 2006/0172829 A1 * | 8/2006 | Ishio | ............... | F16H 61/0021 474/18 |
| 2008/0045378 A1 * | 2/2008 | Kim | ............... | F16H 61/66259 477/46 |
| 2008/0220935 A1 * | 9/2008 | Willeke | ............... | F16H 61/66259 477/49 |
| 2008/0308355 A1 * | 12/2008 | Kakinami | ............... | F16H 57/04 184/27.2 |
| 2011/0176909 A1 * | 7/2011 | Taga | ............... | F16H 57/0434 415/56.3 |
| 2012/0035009 A1 * | 2/2012 | Mano | ............... | F16H 61/0021 474/28 |
| 2012/0040792 A1 * | 2/2012 | Ito | ............... | F16H 61/0025 475/115 |
| 2013/0037144 A1 * | 2/2013 | Fuller | ............... | F16H 61/0025 137/565.29 |
| 2013/0333508 A1 * | 12/2013 | Lundberg | ............... | F16H 61/0021 74/473.11 |
| 2015/0369363 A1 * | 12/2015 | Kanehara | ............... | F16H 61/0021 474/28 |

FOREIGN PATENT DOCUMENTS

| | | |
|---|---|---|
| JP | 2008-267498 A | 11/2008 |
| JP | 2009-115266 A | 5/2009 |
| JP | 2009-174644 A | 8/2009 |
| JP | 2011-149334 A | 8/2011 |
| WO | 2010/103630 A1 | 9/2010 |
| WO | 2012/060117 A1 | 5/2012 |

* cited by examiner

HYDRAULIC PRESSURE SUPPLY APPARATUS FOR AUTOMATIC TRANSMISSION

CROSS-REFERENCE TO RELATED APPLICATION

This application is based upon and claims the benefit of priority from Japanese Patent Application No. 2013-021293 filed on Feb. 6, 2013, the contents of which are incorporated herein by reference.

TECHNICAL FIELD

This invention relates to a hydraulic pressure supply apparatus for an automatic transmission.

BACKGROUND ART

A technology resembling the technical concept of this invention has been known from the disclosure of Patent Document 1. Patent Document 1 teaches a configuration equipped with a composite pump comprising a cycloid pump and a vane pump that achieves necessary and sufficient hydraulic discharge pressure and discharge rate by installing a variable capacity vane pump in parallel with a fixed displacement cycloid as a main pump.

PRIOR ART REFERENCES

Patent References

Patent Reference 1: Japanese Laid-Open Patent Application No. 2003-027912

SUMMARY OF INVENTION

Problems to be Solved by the Invention

Although, as stated above, Patent Document 1 teaches a technology configured to minimize waste energy generation to the utmost possible by using a composite pump comprising a fixed displacement pump and a variable displacement pump, it says nothing about utilizing once generated energy. Such energy utilization is particularly desirable in an automatic transmission equipped with multiple hydraulic actuators and a lubrication system.

Therefore, this invention is aimed at addressing the aforesaid problem by providing a hydraulic pressure supply apparatus for an automatic transmission that effectively utilizes energy in an automatic transmission equipped with multiple hydraulic actuators and a lubrication system.

Means for Solving the Problems

In order to achieve the object, as recited in claim 1, this invention is configured to have a hydraulic pressure supply apparatus for an automatic transmission that conveys hydraulic oil pumped from a reservoir and discharged by a hydraulic pump to hydraulic actuators and a lubrication system, comprising: a first oil passage and a second oil passage that connect the hydraulic pump and the hydraulic actuators; a first regulator valve and a second regulator valve that are installed in the first and second oil passages and depressurize hydraulic pressure of the hydraulic oil discharged from the hydraulic pump to hydraulic pressure required by the hydraulic actuators; a third oil passage and a fourth oil passage that convey hydraulic oil discharged from the first and second regulator valves to the lubrication system or the reservoir; and an ejector that has a nozzle connected to one of the third oil passage and the fourth oil passage, an intake connected to the reservoir, and a diffuser, such that hydraulic oil merged at the diffuser is conveyed to the lubrication system through a fifth oil passage, and the one of the third oil passage and the fourth oil passage to be connected to the nozzle of the ejector is one of the third oil passage and the fourth oil passage through which hydraulic oil of higher hydraulic pressure flows.

In the hydraulic pressure supply apparatus recited in claim 2, it is configured such that other of the third oil passage and the fourth oil passage is connected to the intake of the ejector.

In the hydraulic pressure supply apparatus recited in claim 3, it is configured such that the other of the third oil passage and the fourth oil passage to be connected to the intake of the ejector is one of the third oil passage and the fourth oil passage through which hydraulic oil of lower hydraulic pressure flows.

In the hydraulic pressure supply apparatus recited in claim 4, it is configured to further include: a selector that selects the one of the third oil passage and the fourth oil passage to be connected to the nozzle of the ejector.

In the hydraulic pressure supply apparatus recited in claim 5, it is configured such that the intake of the ejector is connected to the reservoir through a-switcher that connects or disconnects the intake and the reservoir based on a desired pressure of the lubrication system.

In the hydraulic pressure supply apparatus recited in claim 6, it is configured to further include: a second ejector that has a nozzle connected to other of the third oil passage and the fourth oil passage, an intake connected to the reservoir, and a diffuser, such that hydraulic oil merged at the diffuser is conveyed to the lubrication system through a fifth oil passage.

In the hydraulic pressure supply apparatus recited in claim 7, it is configured such that the hydraulic pump comprises a fixed displacement pump.

In the hydraulic pressure supply apparatus recited in claim 8, it is configured such that the hydraulic pump comprises a variable displacement pump.

Effects of the Invention

The hydraulic pressure supply apparatus for an automatic transmission recited in claim 1 is configured to have: first and second regulator valves that are installed in first and second oil passages connecting a hydraulic pump and multiple hydraulic actuators and operate to depressurize hydraulic pressure of hydraulic oil discharged from the hydraulic pump to hydraulic pressure required by the multiple hydraulic actuators; third and fourth oil passages for conveying hydraulic oil discharged from the first and second regulator valves to a lubrication system or a reservoir; and an ejector, having a nozzle connected to one of the third and fourth oil passages, an intake connected to the reservoir, and a diffuser such that hydraulic oil merged at the diffuser is conveyed to the lubrication system through a fifth oil passage, by which configuration hydraulic energy generated by the hydraulic pump can be effectively utilized.

In other words, a configuration is adopted wherein hydraulic oil discharged from regulator valves that depressurize hydraulic pressure of hydraulic oil discharged from a hydraulic pump to hydraulic pressure required by hydraulic actuators is supplied to a lubrication system using an ejector, so that lubricating oil of large flow rate can be generated from the discharge oil of the regulator valves.

Therefore, the required flow rate to be generated by the hydraulic pump can be diminished in comparison with the prior art, including Patent Document 1, with the result that the flow rate increasing effect of the ejector reduces energy loss owing to dissipation as heat of energy generated by the hydraulic pump.

Moreover, since the flow rate demand on the hydraulic pump diminishes, heat generation per unit time during operation of the automatic transmission decreases under predetermined conditions, so that hydraulic oil temperature can be lowered thereby prevent loss of abrasion resistance and judder resistance owing to hydraulic oil degradation, with the result that the durability and reliability of the automatic transmission can be enhanced. In addition, increase in weight and cost due to installation of an oil cooler or similar for augmenting hydraulic oil cooling capability can be avoided.

Furthermore, since it is configured so that the one of the third and fourth oil passages to be connected to the nozzle is the oil passage through which hydraulic oil of higher hydraulic pressure flows, whereby the flow velocity of the hydraulic oil in the nozzle exceeds that in the intake, so that the frequency of turbulence occurrence in the diffuser of the ejector due to hydraulic oil flow velocity difference between the nozzle and the intake can be more reliably reduced. As a result, the energy conversion efficiency of the ejector can also be more reliably enhanced and the hydraulic pressure, i.e., energy (product of flow rate and pressure), of the hydraulic oil outputted from the diffuser can be increased.

The hydraulic pressure supply apparatus recited in claim 2 is configured to connect the intake of the ejector to the other of the third and fourth oil passages, whereby the hydraulic pressure, namely the energy value, of the intake can be made higher than when configured to be fed from the reservoir to the intake, thus increasing the total input energy value of the ejector and enabling effective use of the hydraulic energy generated by the hydraulic pump.

In addition, the frequency of turbulence occurrence in the diffuser due to hydraulic oil flow velocity difference between the ejector nozzle and intake can be reduced, thereby also enhancing the energy conversion efficiency of the ejector and making increase of outlet hydraulic pressure (energy) possible as a result.

In this regard, if the hydraulic pressure supply apparatus is configured to have selector for selecting the one of the third and fourth oil passages to be connected to the nozzle, it becomes possible to use the selector to also ensure, for example, that the pressure of the hydraulic oil fed to the intake of the ejector can more reliably be made greater than the pressure of the intake and similarly to ensure that the frequency of turbulence occurrence in the diffuser of the ejector is more reliably reduced, whereby the energy conversion efficiency of the ejector can be more reliably enhanced and the hydraulic pressure, i.e., energy (product of flow rate and pressure), of the hydraulic oil outputted from the diffuser can be increased.

The hydraulic pressure supply apparatus recited in claim 3 is configured so that the other of the third and fourth oil passages to be connected to the intake is the oil passage through which hydraulic oil of lower hydraulic pressure flows, so that, similarly, the frequency of turbulence occurrence in the diffuser of the ejector can be more reliably reduced and the energy conversion efficiency of the ejector can also be more reliably enhanced, whereby the hydraulic pressure (energy) of the hydraulic oil outputted from the diffuser can be increased.

The hydraulic pressure supply apparatus recited in claim 4 is configured to include a selector that selects the one of the third and fourth oil passages to be connected to the nozzle, whereby the hydraulic oil of high pressure can be more reliably fed to the nozzle of the ejector, the frequency of turbulence occurrence in the diffuser of the ejector can similarly be more reliably reduced, the energy conversion efficiency of the ejector can also be more reliably enhanced, and the hydraulic pressure (energy) of the hydraulic oil outputted from the diffuser can be increased.

The hydraulic pressure supply apparatus recited in claim 5 is configured so that the intake is connected to the reservoir through a switcher that connects or disconnects the intake and the reservoir based on the desired hydraulic pressure of the lubrication system, whereby the hydraulic pressure and flow rate of the lubrication system can be controlled by connecting or disconnecting the intake and reservoir based on, for example, the difference between the desired pressure and actual pressure of the lubrication system.

By this it is possible to reliably avoid occurrence of such adverse phenomena as that power transmission efficiency is degraded because excessive supply of hydraulic oil as lubricant increases the agitation resistance of the hydraulic oil inside the automatic transmission or as that abrasion arises inside the automatic transmission because, to the contrary, the supply of hydraulic oil is insufficient.

The hydraulic pressure supply apparatus recited in claim 6 is configured to further include: a second ejector that has a nozzle connected to other of the third oil passage and the fourth oil passage, an intake connected to the reservoir, and a diffuser, such that hydraulic oil merged at the diffuser is conveyed to the lubrication system through a fifth oil passage, whereby configuration hydraulic energy generated by the hydraulic pump can be utilized more effectively.

The hydraulic pressure supply apparatus recited in claim 7 is configured to use a fixed displacement pump as the hydraulic pump, so that, in addition to the aforesaid effects, required hydraulic pressure and flow rate can be reliably generated with a relatively simple structure.

The hydraulic pressure supply apparatus recited in claim 8 is configured to use a variable displacement pump as the hydraulic pump, so that, in addition to the aforesaid effects, the required flow rate to be generated can be reliably reduced.

DESCRIPTION OF EMBODIMENTS

Embodiments for implementing a hydraulic pressure supply apparatus for an automatic transmission according to this invention are explained with reference to the attached drawings.

Embodiment 1

Figure 1:
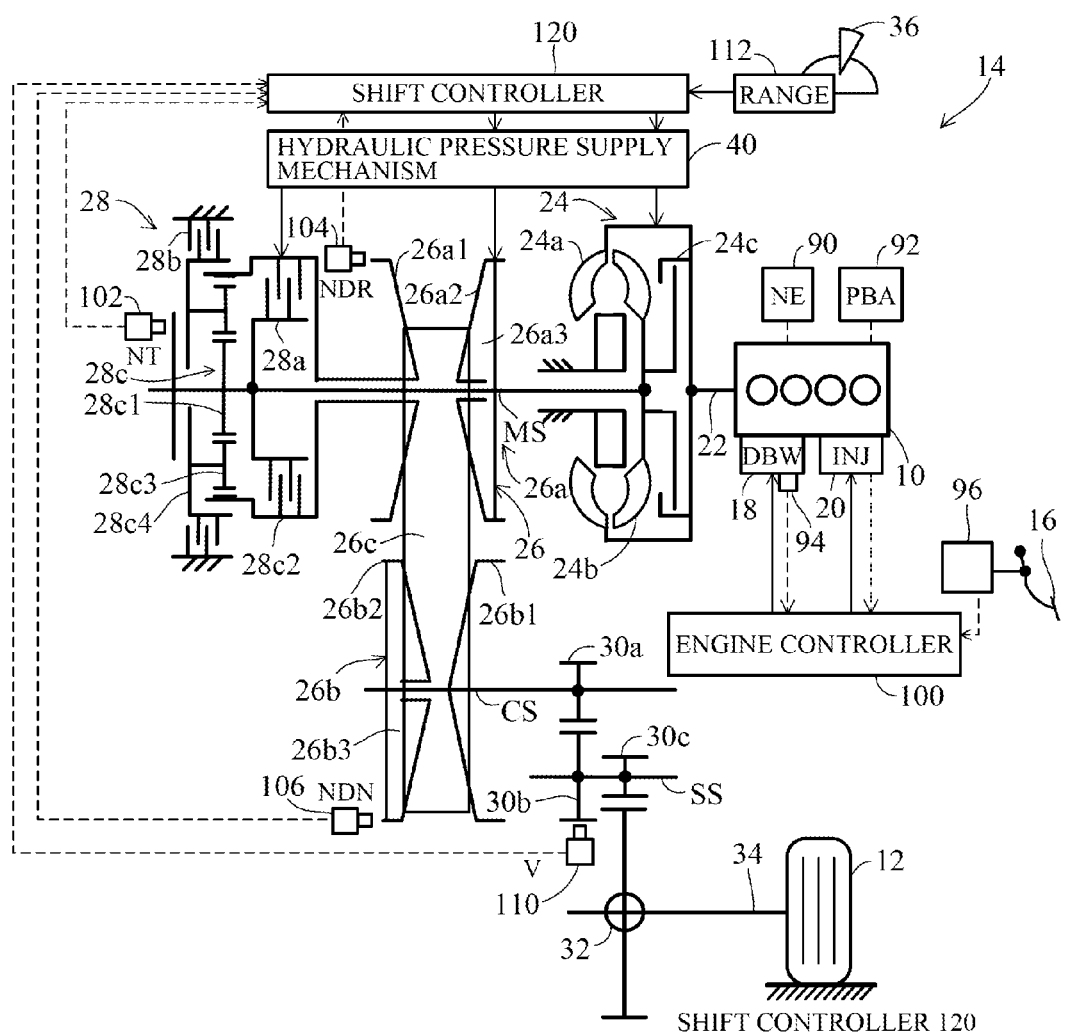
FIG. 1 is a schematic diagram showing an overall view of a hydraulic pressure supply apparatus for an automatic transmission according to a first embodiment of this invention.
Figure 2:
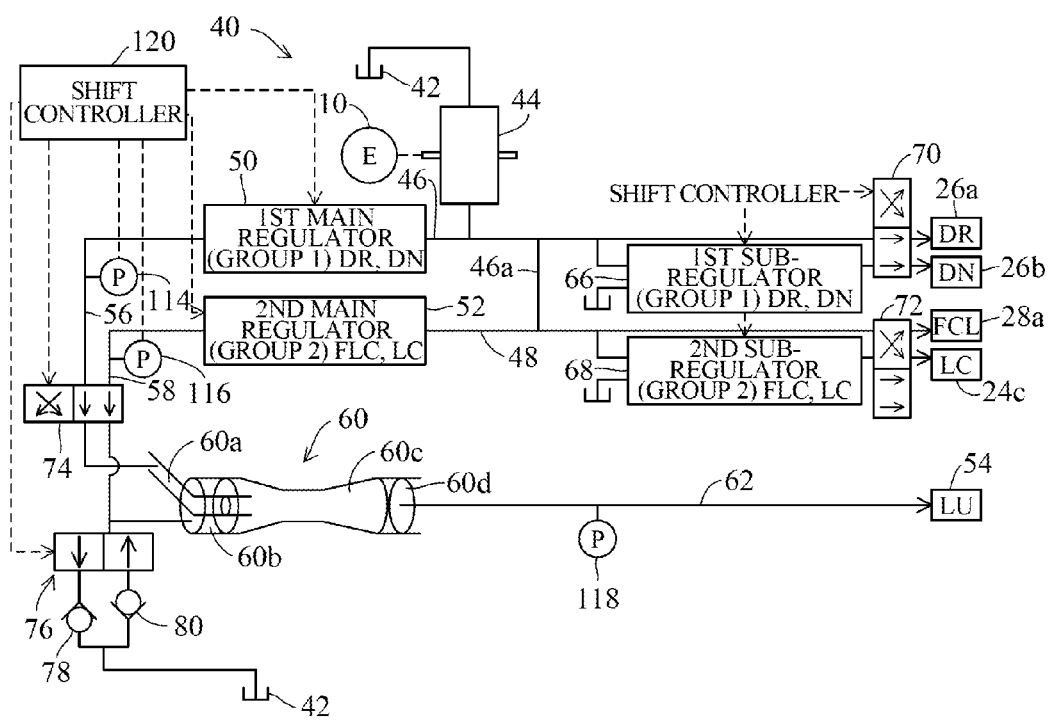
FIG. 2 is a schematic diagram showing an overall view of a hydraulic pressure supply mechanism shown in FIG. 1.
Figure 3:
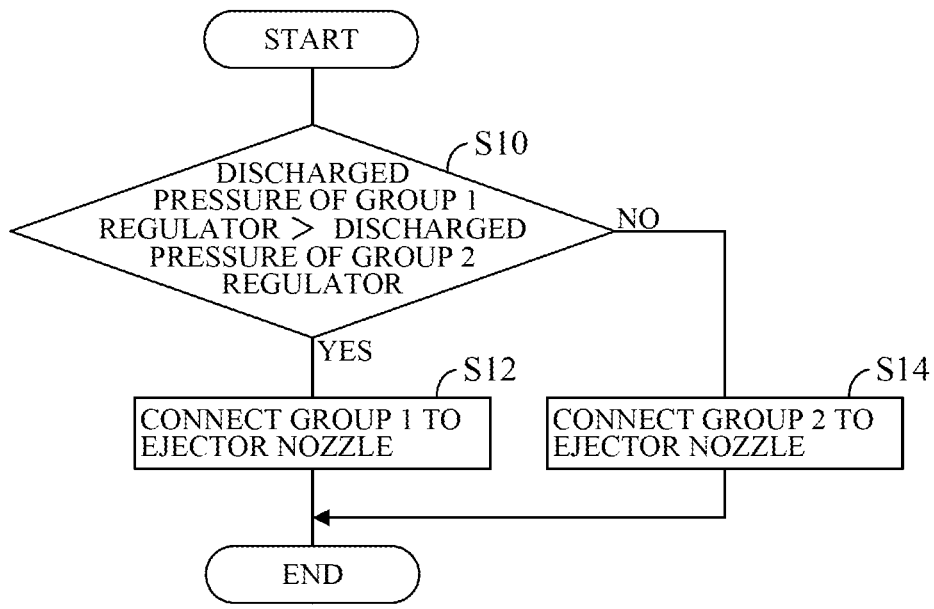
FIG. 3 is a flowchart showing the operation of the hydraulic pressure supply mechanism of FIG. 2.
Figure 4:
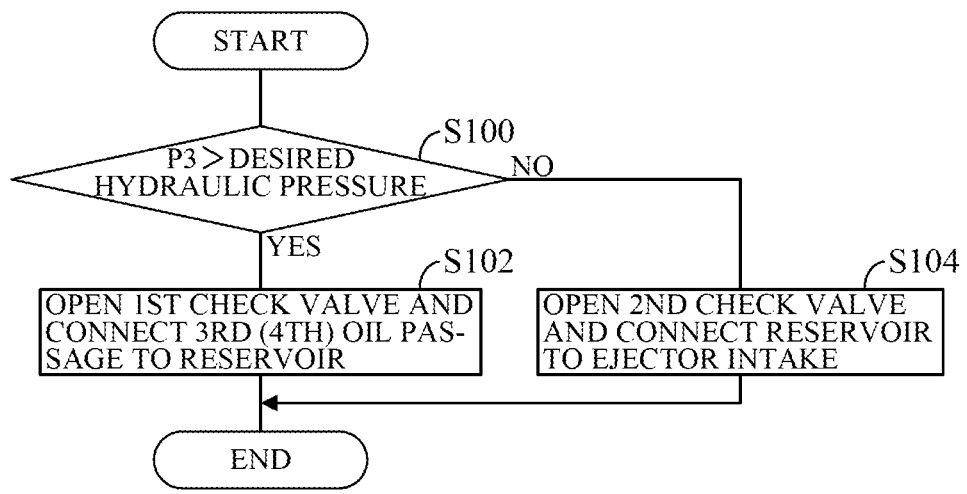
FIG. 4 is a flowchart similarly showing the operation of the hydraulic pressure supply mechanism of FIG. 2.
Figure 5:
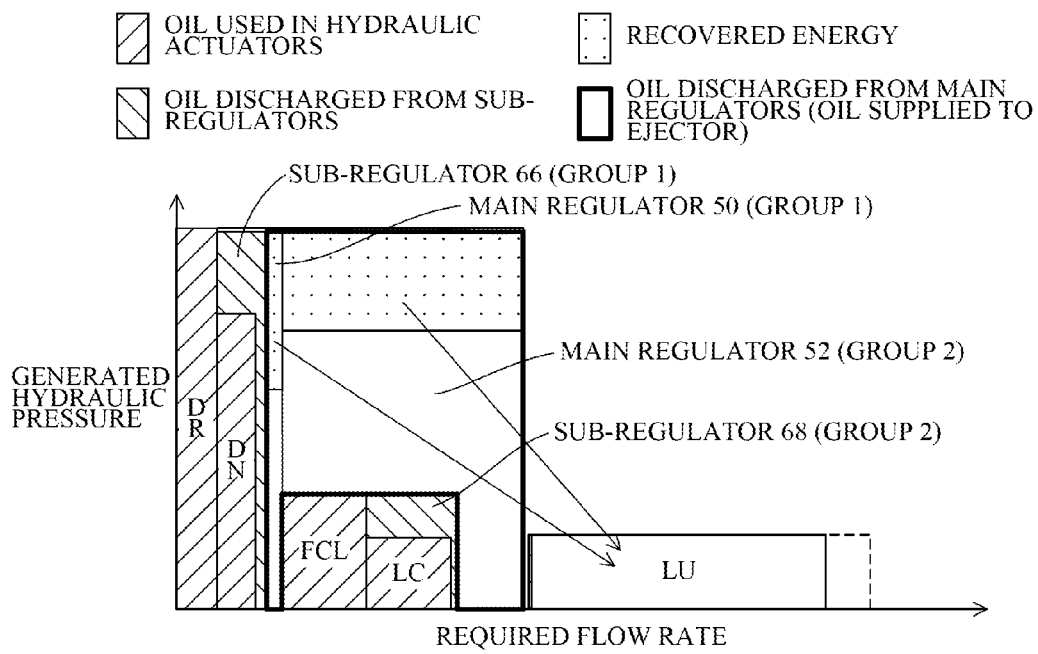
FIG. 5 is an explanatory diagram showing energy loss characteristics of the hydraulic pressure supply mechanism of FIG. 2.

FIG. 1 is a schematic diagram showing an overall view of a hydraulic pressure supply apparatus for an automatic transmission according to a first embodiment of this invention; FIG. 2 is a schematic diagram showing an overall view of a hydraulic pressure supply mechanism shown in FIG. 1; FIGS. 3 and 4 are flowcharts showing the operation of the hydraulic pressure supply mechanism of FIG. 2; and FIG. 5 is an explanatory diagram showing energy loss characteristics of the hydraulic pressure supply mechanism of FIG. 2.

Symbol 10 in FIG. 1 designates an engine (internal combustion engine (prime mover)). The engine 10 is mounted in a vehicle 14 provided with driven wheels 12 (the vehicle 14 is indicated partially by the engine 10, driven wheels 12, etc.).

A throttle valve (not shown) installed in an air-intake system of the engine 10 is mechanically disconnected from an accelerator pedal 16 installed on the floor at a vehicle operator's seat and is connected to and opened/closed by a DBW (Drive By Wire) DBW mechanism 18 comprising an electric motor or other actuator.

Intake air metered by the throttle valve flows through an intake manifold to be mixed with fuel injected from injectors 20 located near intake ports of respective cylinders to form an air-fuel mixture that flows into the cylinder combustion chambers when intake valves are opened. In each combustion chamber, the fuel mixture is ignited by a sparkplug and burns, thereby driving a piston and rotating an output shaft 22 connected to a crankshaft, whereafter it is discharged out of the engine 10 as exhaust.

The rotation of the output shaft 22 of the engine 10 is inputted through a torque converter 24 to a Continuously Variable Transmission (automatic transmission, hereinafter sometimes called "CVT") 26. Specifically, the output shaft 22 of the engine 10 is connected to a pump impeller 24a of the torque converter 24, while a turbine-runner 24b installed opposite thereto to receive a fluid (hydraulic oil, ATF) is connected to a main shaft (input shaft) MS. The torque converter 24 is equipped with a lock-up clutch 24c having a hydraulic mechanism comprising a piston slidable inside a cylinder.

The CVT 26 comprises a drive (DR) pulley (input pulley) 26a fitted on the main shaft MS, more exactly on a peripheral side shaft thereof, a driven (DN) pulley (output pulley) 26b fitted on a countershaft (output shaft) CS which is parallel to the main shaft MS and connected to the driven wheels 12, more exactly on a peripheral side shaft thereof, and an endless transmission element wound around the drive and driven pulleys, e.g., a metal belt 26c.

The drive pulley 26a comprises a fixed pulley half 26a1 fitted on the peripheral side shaft of the main shaft MS to be incapable of relative rotation and of axial direction movement, a movable pulley half 26a2 incapable of rotation relative to the peripheral side shaft of the main shaft MS and capable of relative movement in the axial direction with respect to the fixed pulley half 26a1, and a hydraulic mechanism 26a3 comprising a piston, cylinder and spring, and installed on a side of the movable pulley half 26a2 to press the movable pulley half 26a2 toward the fixed pulley half 26a1 when supplied with hydraulic pressure (hydraulic oil (ATF) pressure).

The driven pulley 26b comprises a fixed pulley half 26b1 fitted on a peripheral side shaft of the countershaft CS to be incapable of relative rotation and of axial direction movement, a movable pulley half 26b2 incapable of rotation relative to the countershaft CS and capable of relative movement in the axial direction with respect to the fixed pulley half 26b1, and a hydraulic mechanism 26b3 comprising a piston, cylinder and spring and installed on a side of the movable pulley half 26b2 to press the movable pulley half 26b2 toward the fixed pulley half 26b1 when supplied with hydraulic pressure.

The CVT 26 is connected to the engine 10 through a forward-reverse switching mechanism 28. The forward-reverse switching mechanism 28 comprises a forward clutch 28a that enables the vehicle 14 to travel forward, a reverse brake-clutch 28b that enables reverse travel, and a planetary-gear set 28c located between the two clutches. The CVT 26 is connected to the engine 10 through the forward clutch 28a. The forward clutch 28a and reverse brake-clutch 28b are each equipped with a pressure mechanism comprising a piston slidable inside a cylinder.

In the planetary-gear set 28c, a sun gear 28c1 is fixed on the main shaft MS and a ring gear 28c2 is fixed on the fixed pulley half 26a1 of the drive pulley 26a through the forward clutch 28a. Pinions 28c3 are installed between the sun gear 28c1 and the ring gear 28c2. The pinions 28c3 are connected to the sun gear 28c1 by a carrier 28c4. When the reverse brake-clutch 28b is operated, the carrier 28c4 is fixed (locked) as a result.

The rotation of the countershaft CS is transmitted from a secondary shaft (intermediate shaft) SS to the driven wheels 12 through gears. Specifically, the rotation of the countershaft CS is transmitted through gears 30a, 30b to the secondary shaft SS, and the rotation of the secondary shaft SS is transmitted through a gear 30c and to the left and right driven wheels (only the left wheel shown) 12 from a differential 32 through driveshafts 34.

Thus, the CVT 26 is on the one hand connected to the engine 10 through the torque converter 24 and is on the other connected to the driven wheels 12 through the forward-reverse switching mechanism 28. The drive/driven pulleys 26a/26b of the CVT 26, the lock-up clutch 24c of the torque converter 24, and the forward clutch 28a (and reverse brake-clutch 28b) of the forward-reverse switching mechanism 28 are, as indicated above, equipped with the hydraulic mechanisms 26a3, 26b3 and the like, and, therefore, the drive/driven pulleys 26a/26b of the CVT 26, the lock-up clutch 24c of the torque converter 24, and the forward clutch 28a (and reverse brake-clutch 28b) of the forward-reverse switching mechanism 28 are hereinafter called hydraulic actuators.

The operator switches between the forward clutch 28a and the reverse brake-clutch 28b in the forward-reverse switching mechanism 28 by operating a range selector 36 provided near the vehicle operator's seat so as to select a range from among P, R, N and D, for example. The range selection by the operator's operation of the range selector 36 is transmitted to a manual valve of a hydraulic pressure supply mechanism 40.

As shown in FIG. 2, the hydraulic pressure supply mechanism 40 comprises a single hydraulic pump 44 for pumping hydraulic oil from a reservoir 42 and discharging the hydraulic oil, first and second oil passages 46 and 48 connecting the hydraulic pump 44 and multiple hydraulic actuators (the drive/driven pulleys 26a/26b, lock-up clutch 24c, forward clutch 28a (and reverse brake-clutch 28b)), first and second regulator valves 50 and 52 installed in the first and second oil passages 46 and 48 for depressurizing hydraulic pressure of hydraulic oil discharged from the hydraulic pump 44 to hydraulic pressure required by the multiple hydraulic actuators, third and fourth oil passages 56 and 58 for conveying hydraulic oil discharged from the first and second regulator valves 50 and 52 to a lubrication system 54 or the reservoir 42, and an ejector 60. The first and second oil passages 46 and 48 are connected by an interconnecting oil passage 46a.

The ejector 60 comprises a nozzle 60a connected to one of the third and fourth oil passages 56 and 58, specifically to third oil passage 56 passing the hydraulic oil of higher pressure, and an intake 60b connected to the reservoir 42 (immersed in hydraulic oil stored in the reservoir 42), and is configured to supply hydraulic oil merged at a diffuser 60c through a fifth oil passage 62 to the lubrication system 54. Moreover, the other of the third and fourth oil passages 56 and 58, i.e., the fourth oil passage 58, is connected also to the intake 60b of the ejector 60.

When the CVT 26 is accommodated in a transmission case (not shown) mounted in the vehicle 14, an oil pan formed under the transmission case in the gravity direction serves as the reservoir 42. Further, by "lubrication system 54" is meant regions such as the drive/driven pulleys 26a/26b and gears 30a, 30b that require hydraulic oil for the purpose of lubrication.

The ejector 60 functions to raise the flow velocity of the fluid passed in from the nozzle 60a at a constricted section so as to produce a negative pressure or a vacuum by which another fluid is sucked in from the intake 60b, merged (mixed) at the diffuser 60c, and the merged fluid is outputted from an outlet 60d.

The hydraulic pump 44 is an inscribed gear pump (fixed displacement pump) having an inner rotor and outer rotor and is connected to the output shaft 22 of the engine (E) 10 via belt-pulley or other suitable speed variation means, and pumps hydraulic oil from the reservoir 42 and delivers it to the first and second oil passages 46 and 48 when driven by the engine 10.

The hydraulic pump 44 has a delivery pressure [MPa] capable of outputting a hydraulic pressure equal to the highest hydraulic pressure among those required by the hydraulic actuators and a rated capacity [1/min] enabling an excess flow rate exceeding the flow rates required by the hydraulic actuators. FIG. 2 designates pressures required to be supplied to the hydraulic actuators of the drive/driven pulleys 26a/26b as DR, DN, pressure required to be supplied to the hydraulic actuator of the forward clutch 28a (and reverse brake-clutch 28b) as FCL, and pressure required to be supplied to the hydraulic actuator of the lock-up clutch 24c as LC, and designates pressure required to be supplied to the lubrication system 54 as LU.

DR, DN of the hydraulic actuators of the drive/driven pulleys 26a/26b, FCL of the hydraulic actuator of the forward clutch 28a (and forward-reverse switching mechanism 28), LC of the hydraulic actuator of the lock-up clutch 24c, and the hydraulic pressure LU of the lubrication system, which are indicated in FIG. 2 as the required hydraulic pressures, descend in magnitude as shown in FIG. 5 under ordinary operating condition, in order from DR, DN of the drive/driven pulleys 26a/26b as the highest pressures, followed by FCL of the forward clutch 28a (and reverse brake-clutch 28b), LC of the lock-up clutch 24c, and LU of the lubrication system 54. Depending on the speed ratio, the hydraulic pressures of the drive/driven pulleys 26a/26b reverse to make DN the higher pressure, so the illustrated on the drawing is only one example.

As shown in FIG. 2, the hydraulic actuators are grouped, specifically, the drive/driven pulleys 26a/26b are placed in Group 1, the hydraulic actuators comprised of the forward clutch 28a (and reverse brake-clutch 28b) and the lock-up clutch 24c are placed in Group 2, and the first and second regulator valves (main regulator valves) 50, 52 are deployed in Group 1 and Group 2, respectively.

The first and second regulator valves 50, 52 are both constituted as electromagnetic solenoid valves that have spools displaceable by plungers of electromagnetic solenoids, and by displacing each plunger in proportion to an applied current, the hydraulic pressure to be supplied to a connected hydraulic pressure demand site is regulated (depressurized) to a value corresponding a required hydraulic pressure of the associated group.

More specifically, the discharge pressure of the hydraulic pump 44 is depressurized until the hydraulic pressure reaches that of the group of higher value between Group 1 in the case of the first regulator valve 50 and Group 2 in the case of the second regulator valve 52.

As illustrated, first and second sub-regulator valves 66 and 68 and switching valves 70, 72 are connected to the first and second oil passages 46 and 48. Like the first and second regulator valves 50, 52, the first and second sub-regulator valves 66 and 68 are also constituted as electromagnetic solenoid valves. The switching valves 70, 72 are also both constituted as electromagnetic solenoid valves having spools displaceable by plungers of electromagnetic solenoids.

The first sub-regulator valve 66 depressurizes the hydraulic pressure of the hydraulic oil depressurized by the first regulator valve 50 and received through the first oil passage 46 to the required hydraulic pressures DR/DN of the drive/driven pulley 26a/26b, and when the first switching valve 70 is energized/de-energized, supplies it to the drive/driven pulley 26a/26b (more exactly, the hydraulic mechanism 26a3/26b3) requiring the depressurized hydraulic oil.

The second sub-regulator valve 68 depressurizes the hydraulic pressure of the hydraulic oil depressurized by the second regulator valve 52 and received through the second oil passage 48 to the required hydraulic pressures FCL, LC of the forward clutch 28a (and reverse brake-clutch 28b) and lock-up clutch 24c, and when the second switching valve 72 is energized/de-energized, supplies it to the forward clutch 28a (and reverse brake-clutch 28b) and the lock-up clutch 24c (more exactly, the hydraulic mechanism thereof) requiring the depressurized hydraulic oil.

The hydraulic pressure supply mechanism 40 supplies hydraulic pressure to the drive/driven pulley 26a/26b, more exactly, the hydraulic mechanism 26a3/26b3 thereof, of the CVT 26 to move the movable pulley half 26a2/26b2 in the axial direction, vary the pulley widths between the drive/driven pulleys 26a/26b and vary the winding radius of the belt 26c, thereby continuously varying the speed ratio at which the rotation of the engine 10 is transmitted to the driven wheels 12.

Although omitted in the drawings, the hydraulic pressure supply mechanism 40 is equipped with various control valves and electromagnetic valves installed in oil passages connecting the hydraulic pump 44 and hydraulic actuators, whereby hydraulic pressure is supplied to the lock-up clutch 24c (more specifically, the hydraulic pressure mechanism thereof) of the torque converter 24 in accordance with the operating condition to engage and disengage the lock-up clutch 24c, and hydraulic pressure is supplied through a manual valve responsive to the position of the range selector 36 selected by the operator and applied to the forward clutch 28a or reverse brake-clutch 28b (more specifically, the hydraulic mechanism thereof) of the forward-reverse switching mechanism 28, thereby enabling the vehicle 14 to drive forward or backward.

Further, in the hydraulic pressure supply mechanism 40, the third and fourth oil passages 56 and 58 are connected to the nozzle 60a of the ejector 60 through a third switching valve (selector) 74. Like the first and second switching valves 70 and 72, the third switching valve 74 is also constituted as an electromagnetic solenoid valve having a spool displaceable by a plunger of an electromagnetic solenoid.

When the third switching valve 74 is de-energized, one of the third and fourth oil passages 56 and 58 (said one), specifically the third oil passage 56 through which hydraulic oil of higher hydraulic pressure flows, is connected to the nozzle 60a of the ejector 60 and other of third and fourth oil passages 56 and 58, specifically the fourth oil passage 58 through which hydraulic oil of lower hydraulic pressure flows, is connected to a downstream fourth switching valve (switcher) 76, while when energized, said other of the third and fourth oil passages 56 and 58, specifically the fourth oil passage 58 through which hydraulic oil of lower hydraulic pressure flows, is connected to the nozzle 60a of the ejector 60, and said one thereof is connected to the fourth switching valve 76. In other words, the third switching valve 74 is de-energized when the hydraulic pressure of the third oil passage 56 is higher than the hydraulic pressure of the fourth oil passage 58 and is energized when the hydraulic pressure of the fourth oil passage 58 is higher than the hydraulic pressure of the third oil passage 56.

The fourth switching valve 76 is also constituted as an electromagnetic solenoid valve having a spool displaceable by a plunger of an electromagnetic solenoid. When the fourth switching valve 76 is de-energized, one of the third and fourth oil passages 56 and 58 (said one) is connected to one check valve (first check valve 78) between the reservoir 42 and the fourth switching valve 76, while when energized, another of the third and fourth oil passages 56 and 58 (said other) is connected to another check valve (second check valve 80) between the reservoir 42 and the fourth switching valve 76. The first and second check valves 78 and 80 individually prevent reverse flow of hydraulic oil. Moreover, the directions in which the third and fourth switching valves 74 and 76 are operated by energization and de-energization can be reversed from that indicated in the foregoing example.

The one of the third and fourth oil passages 56 and 58 not connected to the nozzle 60a downstream of the third switching valve 74, which in the illustrated example is said other of the third and fourth oil passages 56 and 58 (the fourth oil passage 58 through which hydraulic oil of lower hydraulic pressure flows), has a branch that connects to the intake 60b of the ejector 60. In other words, the intake 60b of the ejector 60 is connected to the reservoir 42 and the fourth oil passage 58.

Returning to the explanation of FIG. 1, a crank angle sensor 90 provided at a suitable location, such as near a cam shaft (not shown) of the engine 10, outputs a signal indicating engine speed NE once every predetermined piston crank angle position. A manifold absolute pressure sensor 92 provided in the air-intake system at a suitable position downstream of the throttle valve outputs a signal proportional to the manifold absolute pressure PBA inside the air-intake pipe (engine load).

A throttle opening sensor 94 provided at the actuator of the DBW mechanism 18 outputs a signal proportional to throttle valve opening TH through the amount of actuator rotation, and an accelerator pedal depression sensor 96 provided near the accelerator pedal 16 outputs a signal proportional to accelerator pedal depression AP corresponding to the amount of depression of the accelerator pedal 16 (amount of accelerator pedal operation) by the operator.

The outputs of the crank angle sensor 90 and other sensors are sent to an engine controller 100. The engine controller 100, which is equipped with a microcomputer comprising a CPU, ROM, RAM, I/O and the like, controls the operation of the DBW mechanism 18 in accordance with the outputs of these sensors and controls fuel injection using the injectors 20 and ignition timing using an ignition device.

An NT sensor (rotational speed sensor) 102 provided on the main shaft MS outputs a pulse signal indicating rotational speed NT of the main shaft MS (transmission input shaft rotational speed), and an NDR sensor (rotational speed sensor) 104 provided at a suitable location near the drive pulley 26a of the CVT 26 outputs a pulse signal in accordance with rotational speed NDR of the drive pulley 26a.

Further, an NDN sensor (rotational speed sensor) 106 provided at a suitable location near the driven pulley 26b outputs a pulse signal indicating rotational speed NDN of the driven pulley 26b (transmission output shaft rotational speed), and a vehicle speed sensor (rotational speed sensor) 110 provided near the gear 30b of the secondary shaft SS outputs a pulse signal indicating the rotational speed and rotational direction of the secondary shaft SS (specifically, a pulse signal indicating vehicle speed V).

Moreover, a range selector switch 112 provided near the range selector 36 outputs a signal in accordance with the R, N, D or other range selected by the operator, and first, second and third pressure sensors 114, 116 and 118 provided at the third and fourth oil passages 56 and 58 of the hydraulic pressure supply mechanism 40 output signals indicating hydraulic pressures P1, P2 and P3 of hydraulic oil flowing through the third and fourth oil passages 56 and 58.

The outputs of the NT sensor 102 and other sensors mentioned above are sent to a shift controller 120. The shift controller 120 is also equipped with a microcomputer comprising a CPU, ROM, RAM, I/O and the like and is configured to communicate with the engine controller 100.

Based on the detected values, the shift controller 120 controls the operation of the first and second regulator valves 50 and 52, the first and second sub-regulator valves 66 and 68, and the first to fourth switching valves 70, 72, 74 and 76 in accordance with the required hydraulic pressures of the hydraulic actuators, thereby effecting control to supply required hydraulic pressures and flow rates to the actuators and the lubrication system 54.

Control of the shift controller 120 on the third and fourth switching valves 74 and 76 will be explained. FIG. 3 is a flowchart showing control on the third switching valve 74 and FIG. 4 a flowchart showing control on the fourth switching valve 76.

To explain with reference to FIG. 3, in S10 (S: processing Step), it is determined from the outputs of the first and second pressure sensors 114 and 116 whether the hydraulic pressure (discharge pressure) of Group 1 (third oil passage 56) discharged from the first regulator valve 50 is greater than the hydraulic pressure (discharge pressure) of Group 2 discharged from the second regulator valve 52.

When the result in S10 is YES, the program proceeds to S12, in which Group 1 (third oil passage 56) is connected to the nozzle 60a of the ejector 60, and when the result in S10 is NO, the program proceeds to S14, in which Group 2 (fourth oil passage 58) is connected to the nozzle 60a of the ejector 60.

This makes it possible to supply the nozzle 60a of the ejector 60 with hydraulic oil of higher pressure (compared to that at the intake 60b), and since the flow velocity at the nozzle 60a exceeds that at the intake 60b, the frequency of turbulence occurrence in the diffuser 60c of the ejector 60 due to hydraulic oil flow velocity difference between the nozzle 60a and intake 60b can be more reliably reduced. As a result, the energy conversion efficiency of the ejector 60 can be more reliably enhanced, and the hydraulic pressure, i.e., the energy (product of flow rate and pressure), of the hydraulic oil outputted from the diffuser 60c can be increased.

Next, to explain with reference to FIG. 4, in S100, it is determined from the output of the third pressure sensor 118 whether the detected hydraulic pressure P3 is higher than a desired hydraulic pressure.

When the result in S100 is YES, the program proceeds to S102, in which the fourth switching valve 76 is communicated (operated) in the direction of opening the first check valve 78, thereby connecting so that hydraulic oil flows into the reservoir 42 from one of the third and fourth oil passages 56 and 58. On the other hand, when the result in S100 is NO, the program proceeds to S104, in which the fourth switching valve 76 is communicated (operated) in the direction of opening the second check valve 80, thereby connecting so that hydraulic oil flows into the intake 60b of the ejector 60 from the reservoir 42.

Thus by connecting or disconnecting the intake 60b and the reservoir 42 based on the difference between the desired pressure and actual pressure of the lubrication system, the hydraulic pressure and flow rate of the lubrication system 54 can be controlled to the desired hydraulic pressure, so that it is possible to reliably avoid occurrence of such adverse phenomena as that power transmission efficiency is degraded because excessive supply of hydraulic oil (lubricant) increases the agitation resistance of the hydraulic oil inside the CVT 26 or as that abrasion arises inside the CVT 26 because, to the contrary, the supply of hydraulic oil is insufficient. The aforesaid problem can be even more certainly avoided by setting the desired hydraulic pressure somewhat high.

As set out above, this embodiment is configured to have the single hydraulic pump 44 for pumping hydraulic oil from the reservoir 42 and discharging the hydraulic oil, the first and second oil passages 46 and 48 connecting the hydraulic pump 44 and the multiple hydraulic actuators, the first and second regulator valves 50 and 52 (main regulator valves) installed in the first and second oil passages 46 and 48 for depressurizing the hydraulic pressure (pressure) of hydraulic oil discharged from the hydraulic pump 44 to hydraulic pressure required by the hydraulic actuators, the third and fourth oil passages 56 and 58 for conveying hydraulic oil discharged from the first and second regulator valves 50 and 52 to the lubrication system 54 or the reservoir 42, and the ejector 60, the ejector 60 having the nozzle 60a connected to one of the third and fourth oil passages 56 and 58 (the third oil passage 56), the intake 60b connected to the reservoir 42, and the diffuser 60c, such that hydraulic oil merged at the diffuser 60c is conveyed to the lubrication system 54 through the fifth oil passage 62, and the other of the third and fourth oil passages 56 and 58 (the fourth oil passage 58) being connected to the intake 60b of the ejector 60 through the fourth switching valve 76.

As energy at the outlet 60d of the diffuser 60c of the ejector 60 is equal to the energy at the nozzle 60a and the intake 60b multiplied by a predetermined efficiency η, the flow of hydraulic oil having energy that would have been dissipated heretofore is converted to a hydraulic oil flow with energy having the efficiency η.

Focusing on this hydraulic oil flow, the inventors, by utilizing the oil flow in the lubrication system 54 of the CVT 26, reduced the energy that heretofore had to be generated by the hydraulic pump 44 for supplying the required hydraulic pressure of the lubrication system.

FIG. 5 is an explanatory diagram showing characteristics of energy loss by the hydraulic pressure supply mechanism 40 of FIG. 2.

As illustrated, the hydraulic pressure to be generated by the hydraulic pump 44 is substantially the same as the higher of the required hydraulic pressures DR and DN, and in this embodiment a configuration is adopted whereby the hydraulic oil flow having energy that would have been dissipated heretofore is converted through the ejector 60 to a hydraulic oil flow with energy having the efficiency η and used as lubrication hydraulic oil of the required hydraulic pressure LU, whereby hydraulic energy generated by the hydraulic pump 44 can be effectively used to the extent denoted "Recovered energy" (amounting to the product of hydraulic pressure and flow rate V) in FIG. 5, and required hydraulic pressure LU for lubrication of a high flow rate can be generated from the discharge oil of the first and second regulator valves 50, 52. The broken-line portion of the required hydraulic pressure LU for lubrication indicates excess.

Therefore, thanks to the flow rate increasing effect of this ejector 60, the required flow rate to be generated by the hydraulic pump 44 can be diminished in comparison with the prior art, so that energy loss owing to dissipation as heat of energy generated by the hydraulic pump 44 can be reduced.

Moreover, since the flow rate demand on the hydraulic pump 44 diminishes, heat generation per unit time during operation of the automatic transmission decreases under predetermined conditions, so that hydraulic oil temperature can be lowered thereby prevent loss of abrasion resistance between metal components and judder resistance of the forward clutch 28a and the like owing to hydraulic oil degradation, with the result that the durability and reliability of the CVT 26 can be further enhanced. In addition, increase in weight and cost due to installation of an oil cooler or the like for augmenting hydraulic oil cooling capability can be avoided.

Moreover, a configuration is adopted that connects the other of the third and fourth oil passages 56 and 58 to the intake 60b of the ejector 60, whereby the hydraulic pressure, namely the energy value, of the intake 60b can be made higher than when configured to be fed from the reservoir 42 to the intake 60b, thus making it possible to increase the recovered energy value of the ejector 60 and to use the hydraulic energy generated by the hydraulic pump 44 more effectively.

In addition, the frequency of turbulence occurrence in the diffuser 60c due to hydraulic oil flow velocity difference between the ejector nozzle and intake 60b of the ejector 60 can be reduced, thereby also enhancing the energy conversion efficiency of the ejector 60c and making increase of the hydraulic pressure (energy) of the outlet 60d possible as a result.

Moreover, a configuration is adopted wherein the one of the third and fourth oil passages 56 and 58 to be connected to the nozzle 60a of the ejector 60 is the oil passage through which hydraulic oil of higher hydraulic pressure flows, whereby the flow velocity of the hydraulic oil in the nozzle 60a exceeds that in the intake, so that the frequency of turbulence occurrence in the diffuser 60c of the ejector 60 can be more reliably reduced. As a result, the energy conversion efficiency of the ejector 60 can also be more reliably enhanced and the hydraulic pressure, i.e., energy, of the hydraulic oil outputted from the diffuser 60c can be increased.

Further, a configuration is adopted that comprises the third switching valve (selector) 74 for selecting the one of the third and fourth oil passages 56 and 58 to be connected to the nozzle 60a, whereby the selector can be used, for example, to increase the hydraulic oil fed to the nozzle 60b of the ejector 60 than that fed to the intake 60b, and the frequency of turbulence occurrence in the diffuser 60c of the ejector 60 can similarly be more reliably reduced. As a result, the energy conversion efficiency of the ejector 60 can also be more reliably enhanced, and the hydraulic pressure (energy) of the hydraulic oil outputted from the diffuser 60c can be increased.

Additionally, a configuration is adopted wherein the other of the third and fourth oil passages 56 and 58 to be connected to the intake 60b is the oil passage through which hydraulic oil of lower hydraulic pressure flows, so that, similarly, the frequency of turbulence occurrence in the diffuser 60c of the ejector 60 can be more reliably reduced. As a result, the energy conversion efficiency of the ejector 60 can also be more reliably enhanced, and the hydraulic pressure (energy) of the hydraulic oil outputted from the diffuser 60c can be increased.

Moreover, a configuration is adopted wherein the intake 60b is connected to the reservoir 42 through the fourth switching valve (switcher) 76, and the fourth switching valve 76 connects or disconnects the intake 60b and the reservoir 42 based on the desired pressure of the lubrication system 54, whereby the hydraulic pressure and flow rate of the lubrication system 54 can be controlled to the desired value by connecting or disconnecting the intake 60b and the reservoir 42 based on the difference between the desired pressure and the actual pressure of the lubrication system 54.

As a result, it is possible to reliably avoid occurrence of such adverse phenomena as that the power transmission efficiency is degraded because excessive supply of hydraulic oil (lubricating oil) increases the agitation resistance of the hydraulic oil inside the CVT 26 or as that abrasion arises inside the CVT 26 because, to the contrary, the supply of hydraulic oil is insufficient.

Further, a configuration is adopted wherein the hydraulic pump 44 is a fixed displacement pump, so that, in addition to the aforesaid effects, the required flow rate to be generated can be reliably generated with a relatively simple structure.

Figure 6:
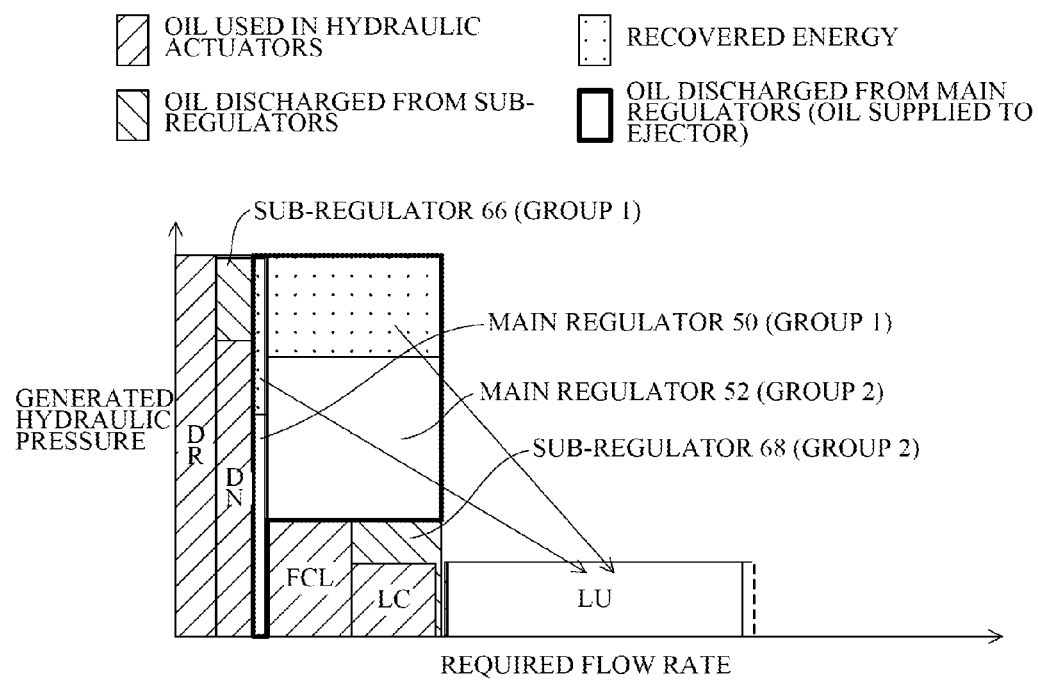
FIG. 6 is a similar explanatory diagram as FIG. 5 showing energy loss characteristics of a hydraulic pressure supply mechanism, showing a modification of the first embodiment.

FIG. 6 is an explanatory diagram showing energy loss characteristics of a hydraulic pressure supply mechanism, showing a modification of the first embodiment.

The point modified from the first embodiment is in adopting a configuration using a variable displacement pump for the hydraulic pump 44. Although using a variable displacement pump makes the structure somewhat complicated, it can be seen from the drawing that the flow rate required to be generated by the hydraulic pump 44 can be reduced. The effects and configuration are otherwise no different from those of the first embodiment.

Embodiment 2

Figure 7:
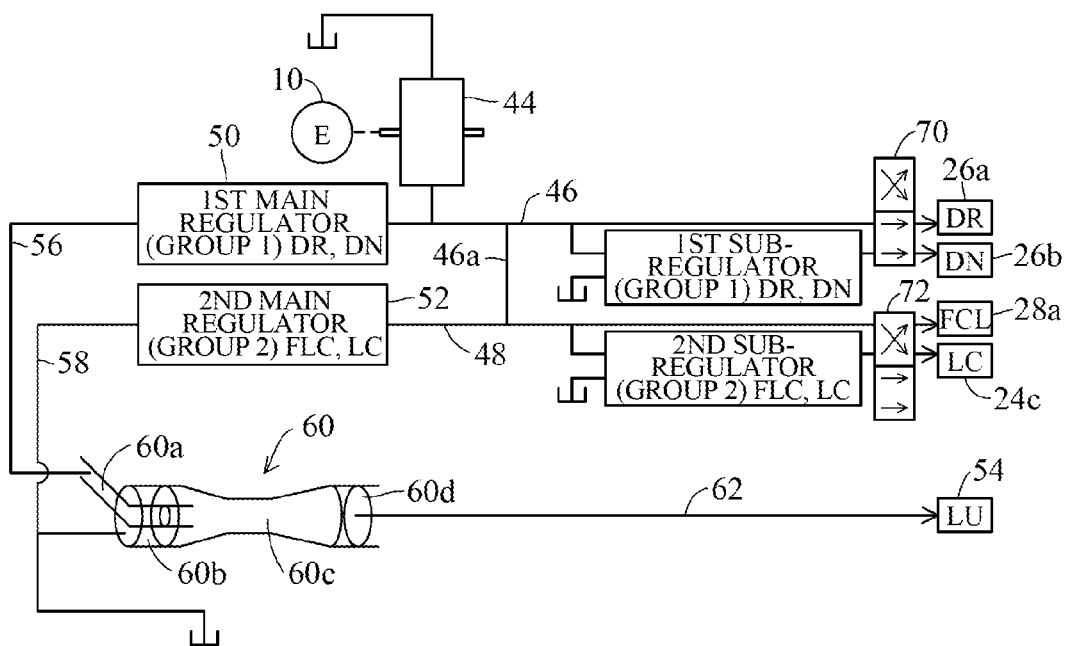
FIG. 7 is a schematic diagram showing an overall view of a hydraulic pressure supply mechanism of a hydraulic pressure supply apparatus for an automatic transmission according to a second embodiment of this invention.

FIG. 7 is a schematic diagram showing an overall view of a hydraulic pressure supply mechanism of a hydraulic pressure supply apparatus for an automatic transmission according to a second embodiment of this invention.

The second embodiment comprises: a single hydraulic pump 44 for pumping hydraulic oil from a reservoir 42 and discharging the hydraulic oil; first and second oil passages 46 and 48 connecting the hydraulic pump 44 and multiple hydraulic actuators (drive/driven pulleys 26a/26b, lock-up clutch 24c, forward clutch 28a (and reverse brake-clutch 28b)); first and second regulator valves 50 and 52 (main regulator valves) installed in the first and second oil passages 46 and 48 for depressurizing the hydraulic pressure (pressure) of hydraulic oil discharged from the hydraulic pump 44 to hydraulic pressure required by the multiple hydraulic actuators; third and fourth oil passages 56 and 58 for conveying hydraulic oil discharged from the first and second regulator valves 50 and 52 to a lubrication system 54 or the reservoir 42; and an ejector 60, the ejector 60 having a nozzle 60a connected to one of the third and fourth oil passages 56 and 58, specifically, generally to the third oil passage 56 passing hydraulic oil of higher pressure, an intake 60b connected to the reservoir 42 (and the fourth oil passage 58 passing hydraulic oil of lower pressure), and a diffuser 60c that merges and supplies hydraulic oil to the lubrication system 54 through a fifth oil passage 62.

The point of difference from the first embodiment is that in the second embodiment the configuration of the first embodiment is simplified by eliminating the third and fourth switching valves 74 and 76 of the first embodiment. In other words, a configuration is adopted that directly connects the third and fourth oil passages 56 and 58 to the ejector 60 and the like.

The second embodiment, being configured in the foregoing manner, can, similarly to the first embodiment, effectively utilize the hydraulic pressure energy generated by the hydraulic pump 44, and can generate lubricating oil of large flow rate from the discharge oil of the first and second regulator valves 50, 52, particularly the first regulator valve 50. The amount of energy recovered by the ejector 60 is substantially the same as in the first embodiment.

The configuration of the second embodiment is thus simplified, albeit at the expense of making control of the hydraulic pressure and flow rate of the lubrication system 54 more difficult, but aside from theses aspects its effects and configuration are no different from those of the first embodiment.

Embodiment 3

Figure 8:
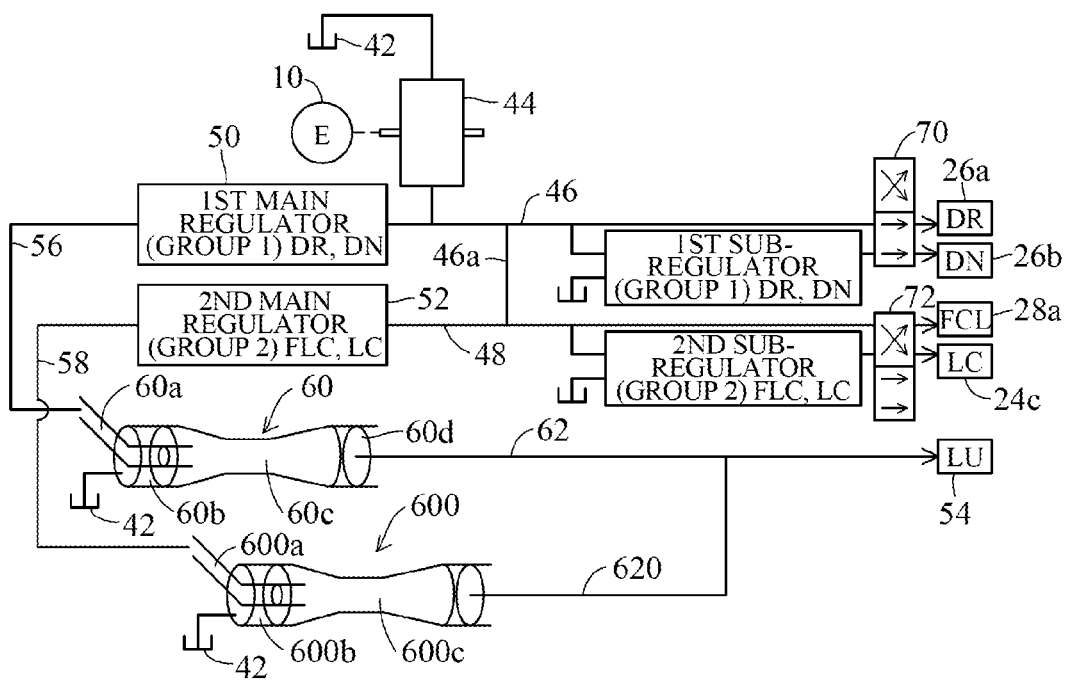
FIG. 8 is a schematic diagram showing an overall view of a hydraulic pressure supply mechanism of a hydraulic pressure supply apparatus for an automatic transmission according to a third embodiment of this invention.

FIG. 8 is a schematic diagram showing an overall view of a hydraulic pressure supply mechanism of a hydraulic pressure supply apparatus for an automatic transmission according to a third embodiment of this invention.

Similarly to the first embodiment, the third embodiment comprises: a single hydraulic pump 44 for pumping hydraulic oil from a reservoir 42 and discharging the hydraulic oil; first and second oil passages 46 and 48 connecting the hydraulic pump 44 and multiple hydraulic actuators (drive/driven pulleys 26a/26b, lock-up clutch 24c, forward clutch 28a (and reverse brake-clutch 28b)); first and second regulator valves 50 and 52 installed in the first and second oil passages 46 and 48 for depressurizing the hydraulic pressure of hydraulic oil discharged from the hydraulic pump 44 to hydraulic pressure required by the multiple hydraulic actuators; third and fourth oil passages 56 and 58 for conveying hydraulic oil discharged from the first and second regulator valves 50 and 52 (main regulator valves) to a lubrication system 54 or the reservoir 42; and an ejector 60, the ejector 60 having a nozzle 60a connected to one of the third and fourth oil passages 56 and 58, specifically to the third oil passage 56 passing hydraulic oil of higher pressure, an intake 60b connected to the reservoir 42, and a diffuser 60c that merges and supplies hydraulic oil to the lubrication system 54 through a fifth oil passage 62.

The point of difference from the first embodiment is that in the configuration of the third embodiment, as in the second embodiment, the third and fourth switching valves 74 and 76 of the first embodiment are eliminated, and moreover, a second ejector 200 is incorporated in addition to the ejector 60.

Specifically, the configuration comprises the ejector 60 and the ejector 60 and a second ejector 600, connects the nozzle 60a of the ejector 60 to one of the third and fourth oil passages 56 and 58, specifically to the third oil passage 56 passing hydraulic oil of higher pressure, connects the intake 60b of the ejector 60 to the reservoir 42, supplies hydraulic oil merged at the diffuser 60c through the fifth oil passage 62 to the lubrication system 54, further connects a nozzle 600a of the second ejector 600 to other of the third and fourth oil passages 56 and 58, specifically to the fourth oil passage 58 passing hydraulic oil of lower pressure, connects an intake 600b of the ejector 600 to the reservoir 42, and supplies hydraulic oil merged at the diffuser 600c through fifth oil passages 62 and 620 to the lubrication system 54.

Being configured in the foregoing manner, the third embodiment incorporates the second ejector 600 in addition to the ejector 60, whereby the amount of recovered energy can be increased in comparison with the first embodiment, the hydraulic energy generated by the hydraulic pump, including the portion recovered by the second ejector 600, can be still more effectively utilized, and lubricating oil of large flow rate can be generated from the discharge oil of the first and second regulator valves 50, 52.

The configuration of the third embodiment, like that of the second embodiment, makes control of the hydraulic pressure and flow rate of the lubrication system 54 more difficult on the one hand and on the other hand increases recovered energy owing to the addition of the second ejector 600, but aside from these aspects its effects and configuration are no different from those of the first embodiment.

As stated above, the first to third embodiments are configured to have a hydraulic pressure supply apparatus for an automatic transmission (CVT 26) that conveys hydraulic oil pumped from a reservoir (42) and discharged by a hydraulic pump (44) to hydraulic actuators (drive/driven pulley 26a, 26b, forward clutch 28a (reverse brake-clutch 28b), lock-up clutch 24c) and a lubrication system (54), comprising: a first oil passage (46) and a second oil passage (48) that connect the hydraulic pump (44) and the hydraulic actuators; a first regulator valve (50) and a second regulator valve (52) that are installed in the first and second oil passages (46, 48) and depressurize hydraulic pressure of the hydraulic oil discharged from the hydraulic pump (44) to hydraulic pressure required by the hydraulic actuators; a third oil passage (56) and a fourth oil passage (58) that convey hydraulic oil discharged from the first and second regulator valves (50, 52) to the lubrication system (54) or the reservoir (42); and an ejector (60) that has a nozzle (60a) connected to one of the third oil passage (56) and the fourth oil passage (58), an intake (60b) connected to the reservoir (42), and a diffuser (60c), such that hydraulic oil merged at the diffuser (60c) is conveyed to the lubrication system (54) through a fifth oil passage (62). With this, hydraulic energy generated by the hydraulic pump 44 can be effectively utilized.

The third embodiment is configured to have the ejector (60) and a second ejector (600), connects the nozzle (60a) of the ejector (60) to one of the third and fourth oil passages (56) and (58), specifically to the third oil passage (56) passing hydraulic oil of higher pressure, connects the intake (60b) of the ejector (60) to the reservoir (42), supplies hydraulic oil merged at the diffuser (60c) through the fifth oil passage (62) to the lubrication system (54), further connects a nozzle (600a) of the second ejector (600) to other of the third and fourth oil passages (56) and (58), specifically to the fourth oil passage (58) passing hydraulic oil of lower pressure, connects an intake (600b) of the ejector (600) to the reservoir (42), and supplies hydraulic oil merged at a diffuser (600c) through fifth oil passages (62) and (620) to the lubrication system (54). With this, since it incorporates the second ejector 600 in addition to the ejector 60, whereby the amount of recovered energy can be increased in comparison with the first embodiment, the hydraulic energy generated by the hydraulic pump, including the portion recovered by the second ejector 600, can be still more effectively utilized, and lubricating oil of large flow rate can be generated from the discharge oil of the first and second regulator valves 50, 52.

In the apparatus, the other of the third oil passage (56) and the fourth oil passage (58) is connected to the intake (60b) of the ejector (60). With this, the hydraulic pressure, namely the energy value, of the intake 60b can be made higher than when configured to be fed from the reservoir 42 to the intake, thus increasing the total input energy value of the ejector 60 and enabling effective use of the hydraulic energy generated by the hydraulic pump 44.

In the apparatus, the one of the third oil passage (56) and the fourth oil passage (58) to be connected to the nozzle (60a) of the ejector (60) is one of the third oil passage (56) and the fourth oil passage (58) through which hydraulic oil of higher hydraulic pressure flows. With this, the flow velocity of the hydraulic oil in the nozzle 60a exceeds that in the intake 60b, so that the frequency of turbulence occurrence in the diffuser 60c of the ejector 60 due to hydraulic oil flow velocity difference between the nozzle 60a and the intake 60b can be more reliably reduced. As a result, the energy conversion efficiency of the ejector 60 can also be more reliably enhanced and the hydraulic pressure (energy) of the hydraulic oil outputted from the diffuser 60c can be increased.

The apparatus further includes: a selector (third switching valve 74) that selects the one of the third oil passage (56) and the fourth oil passage (58) to be connected to the nozzle (60a) of the ejector (60). With this, the selector can be used, for example, to increase the hydraulic oil fed to the nozzle 60b of the ejector 60 than that fed to the intake 60b, and the frequency of turbulence occurrence in the diffuser 60c of the ejector 60 can similarly be more reliably reduced. As a result, the energy conversion efficiency of the ejector 60 can also be more reliably enhanced, and the hydraulic pressure (energy) of the hydraulic oil outputted from the diffuser 60c can be increased.

In the apparatus, the other of the third oil passage (56) and the fourth oil passage (58) to be connected to the intake (60b) of the ejector (60) is one of the third oil passage (56) and the fourth oil passage (58) through which hydraulic oil of lower hydraulic pressure flows. With this, similarly, the frequency of turbulence occurrence in the diffuser 60c of the ejector 60 can be more reliably reduced and the energy conversion efficiency of the ejector 60 can also be more reliably enhanced, whereby the hydraulic pressure (energy) of the hydraulic oil outputted from the diffuser 60c can be increased.

The apparatus further includes: a selector (third switching valve 74) that selects the one of the third oil passage (56) and the fourth oil passage (58) to be connected to the nozzle (60a) of the ejector (60). With this, the hydraulic oil of high pressure can be more reliably fed to the nozzle 60a of the ejector 60, the frequency of turbulence occurrence in the diffuser 60c of the ejector 60 can similarly be more reliably reduced, the energy conversion efficiency of the ejector 60 can also be more reliably enhanced, and the hydraulic pressure (energy) of the hydraulic oil outputted from the diffuser 60c can be increased.

In the apparatus, the intake (60b) of the ejector (60) is connected to the reservoir (42) through a switcher (fourth switching valve 76) that connects or disconnects the intake (60b) and the reservoir (42) based on a desired pressure of the lubrication system (54). With this, the hydraulic pressure and flow rate of the lubrication system 54 can be controlled to the desired values by connecting or disconnecting the intake 60b and reservoir 42 based on, for example, the difference between the desired pressure and actual pressure of the lubrication system 54.

In the apparatus, the hydraulic pump (44) comprises a fixed displacement pump. With this, in addition to the aforesaid effects, required hydraulic pressure and flow rate can be reliably generated with a relatively simple structure.

In the apparatus, the hydraulic pump (44) comprises a variable displacement pump. With this, in addition to the aforesaid effects, the required flow rate to be generated can be reliably reduced as shown in FIG. 6.

It should be noted in the above that, although various configurations are disclosed from the first to the third embodiments, a variety of alterations can still be made by increasing or decreasing elements.

INDUSTRIAL APPLICABILITY

According to the invention, since it is configured to have a first and a second regulator valves that are installed in a first and a second oil passages that connect a hydraulic pump for pumping and discharging hydraulic oil from a reservoir and a plurality of hydraulic actuators and depressurize the hydraulic oil discharged from the pump to pressure required by the hydraulic actuators, a third and a fourth oil passages that convey discharged hydraulic oil to lubrication system and an ejector having a nozzle connected to one of the third and fourth oil passages and an intake connected to the reservoir such that hydraulic oil merged at a diffuser is conveyed to the lubrication system through a fifth oil passage, hydraulic energy generated by the hydraulic pump can be effectively utilized in an automatic transmission having the hydraulic actuators and lubrication system.

DESCRIPTION OF SYMBOLS 10 engine (internal combustion engine; prime mover), 12 driven wheels, 14 vehicle, 16 accelerator pedal, 18 DBW mechanism, 24 torque converter, 24c lock-up clutch (hydraulic actuator), 26 Continuously Variable Transmission (CVT; automatic transmission), 26a, 26b drive/driven pulley (hydraulic actuator), 26a3, 26b3 hydraulic mechanism, 28 forward-reverse switching mechanism, 28a forward clutch (hydraulic actuator), 40 hydraulic pressure supply mechanism, 42 reservoir, 44 hydraulic pump, 46, 48 first, second oil passage, 50, 52 first, second regulator valve (main regulator valve), 54 lubrication system, 56 third oil passage, 58 fourth oil passage, 60 600 ejector, 60a, 600a nozzle, 60b, 600b intake, 60c, 600c diffuser, 60d outlet, 62, 620 fifth oil passage, 66, 68 first, second sub-regulator valve, 70, 72 first, second switching valve, 74 third switching valve (selector), 76 fourth switching valve (switcher), 100 engine controller, 120 shift controller

The invention claimed is:

1. A hydraulic pressure supply apparatus for an automatic transmission that conveys hydraulic oil pumped from a reservoir and discharged by a hydraulic pump to hydraulic actuators and a lubrication system, comprising:
   a first oil passage and a second oil passage that connect the hydraulic pump and the hydraulic actuators;
   a first regulator valve and a second regulator valve that are installed in the first and second oil passages and depressurize hydraulic pressure of the hydraulic oil discharged from the hydraulic pump to hydraulic pressure required by the hydraulic actuators;
   a third oil passage and a fourth oil passage that convey hydraulic oil discharged from the first and second regulator valves to the lubrication system or the reservoir; and
   an ejector that has a nozzle connected to one of the third oil passage and the fourth oil passage, an intake connected to the reservoir, and a diffuser, such that hydraulic oil merged at the diffuser is conveyed to the lubrication system through a fifth oil passage, other of the third oil passage and the fourth oil passage is connected to the intake of the ejector, and a hydraulic pressure of hydraulic oil flowing through the one of the third oil passage and the fourth oil passage to be connected to the nozzle of the ejector is higher than a hydraulic pressure of hydraulic oil flowing through the other of the third oil passage and the fourth oil passage.

2. The apparatus according to any of claim 1, further including:
   a selector that selects the one of the third oil passage and the fourth oil passage to be connected to the nozzle of the ejector.

3. The apparatus according to claim 1, wherein the intake of the ejector is connected to the reservoir through a switcher that connects or disconnects the intake and the reservoir based on a desired pressure of the lubrication system.

4. The apparatus according to claim 1, wherein the hydraulic pump comprises a fixed displacement pump.

5. The apparatus according to claim 1, wherein the hydraulic pump comprises a variable displacement pump.

6. The apparatus according to claim 1, wherein the automatic transmission comprises a continuously variable transmission having a drive pulley and a driven pulley, and the hydraulic actuators include the drive pulley and driven pulley of the continuously variable transmission.

* * * * *